Oct. 24, 1967 W. H. HILL 3,349,218
PRECISION ELECTRODE ASSEMBLY
Filed July 20, 1964
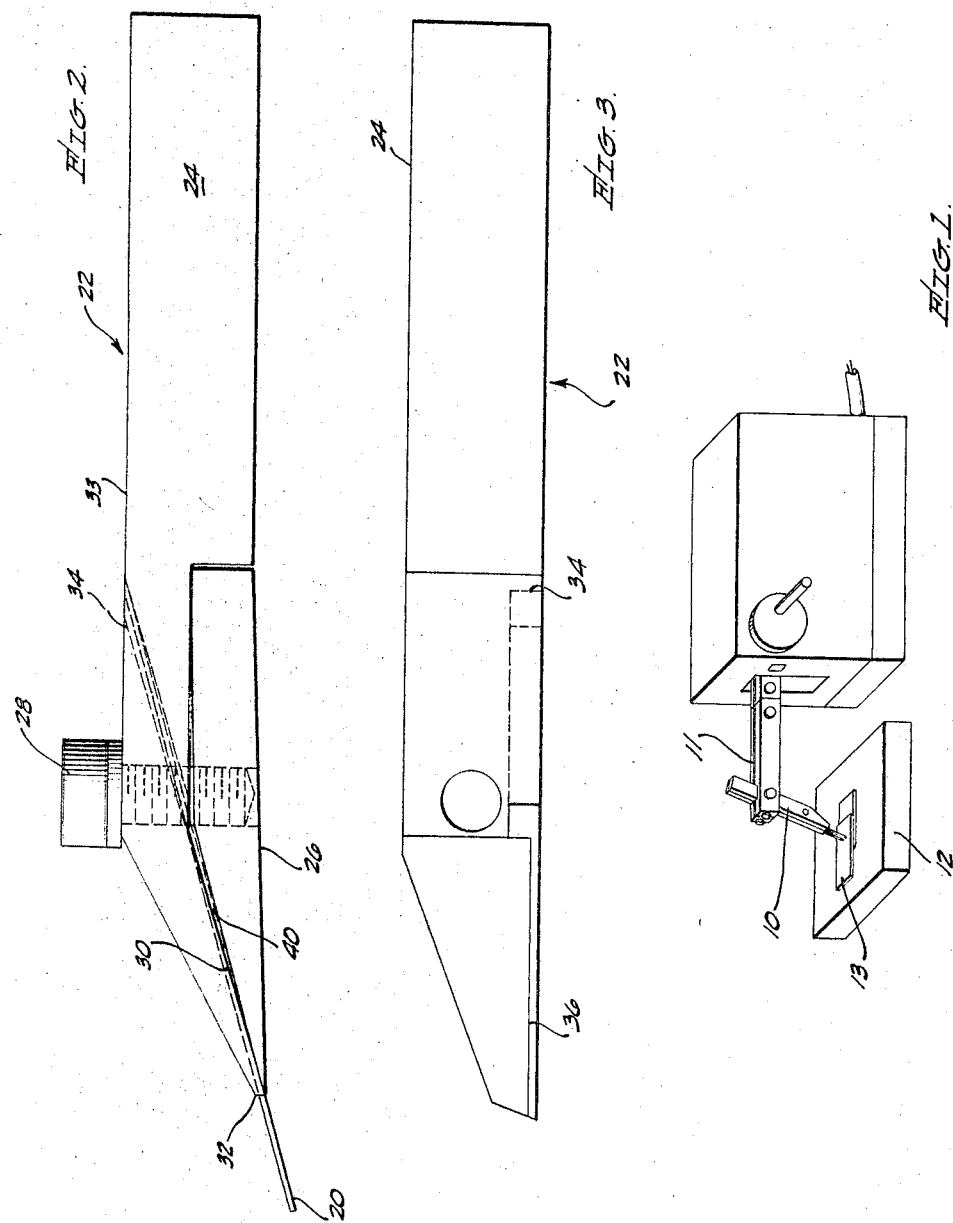
INVENTOR.
WILLIAM H. HILL,
BY
Walter R. Hill
ATTORNEY.

United States Patent Office 3,349,218
Patented Oct. 24, 1967

3,349,218
PRECISION ELECTRODE ASSEMBLY
William H. Hill, Carlsbad, Calif., assignor to Hughes Aircraft Company, Culver City, Calif., a corporation of Delaware
Filed July 20, 1964, Ser. No. 383,829
2 Claims. (Cl. 219—119)

ABSTRACT OF THE DISCLOSURE

The disclosed precision electrode holder comprises a slot-defining holder member having a holding surface on which a ribbon electrode is retained by means of a wedge-shaped member which is brought into clamping relationship with the holding surface. The holder member has a tapered tip portion which deflects the ribbon electrode when the wedge-shaped member is tightened against the holder member whereby said electrode tip is precisely positioned on a workpiece.

---

This invention relates to welding electrodes and holding means therefor and more particularly to welding electrodes of thin ribbon like material and a unique clamp type holding mechanism.

The increased importance of microcircuit packages and components has presented to the industry the difficult problem of producing these extremely small and complex units in an efficient and economical manner. To solve this problem the industry has developed precision welding equipment incorporating weld heads having precisely controlled welding forces. While acceptable weld heads have been developed, in general, a problem still exists in the design of the electrodes utilized with these heads.

Therefore, it is an object of the present invention to provide an improved welding electrode assembly including a precision electrode and a device for securing the electrode.

It is a further object of the present invention to provide an improved welding electrode assembly adapted to efficiently and economically perform precision welding operations.

It is a still further object of the present invention to provide an electrode for welding operations which is relatively small, having a precise shape but yet relatively inexpensive and easily replaceable.

Briefly, the improved electrode and holder of the present inention comprise an elongated support member adapted to be retained by an electrode arm of a conventional resistance weld head which includes a slot and a specifically shaped clamping surface for receiving and positioning an electrode of a ribbon like metallic material. The electrode is clamped to the support member by a wedge member which is secured to the support member by a conventional screw means. Therefore by positioning the ribbon so that it extends through the slot, along the clamping surface and slightly beyond the end of the support member and by securing the clamping member to the support member an electrode assembly is formed having a precision electrode.

Other advantages of the invention will hereinafter become more fully apparent from the following description of the drawings which illustrate a preferred embodiment thereof, and in which:

FIGURE 1 is a perpsective view of a typical weld head showing the securing of the electrode assembly of the present invention in the electrode arms;

FIG. 2 is an enlarged front view of the holder and electrode assembly of the present invention showing the element thereof;

FIG. 3 is a side view of the electrode holder of the present invention showing the retaining shoulder and the slot.

Referring now to FIG. 1 a conventional resistance weld head of the series type, such as a Model VTA–90 manufactured by the assignee of the present invention is shown to illustrate a typical application for the electrode assembly of the present invention. Here the electrode assembly 10 is secured in a movable arm 11 of the weld head and offset 20° from the vertical toward the operator (not shown) to provide unobstructed vertical visibility and allowing lighting of the work when it is placed under the electrodes. Typically the workpiece is placed on a plate or platform 12 of electrical insulating material such as phenolic and the arm is moved through operating means such as a foot pedal until the electrodes contact a workpiece 13 with a predetermined magnitude of force thus actuating a welding energy power supply coupled to the weld head to supply weld energy to the electrodes.

In precision welding of microcircuits and components where access to the underside of the microcircuit or component is limited it is desirable to position both of the welding electrodes on the same side of the workpiece rather than the conventional technique of positioning one above and one below the workpiece. By bringing both electrodes into contact with the workpiece on the same side thereof and by making the tip of the electrodes small welds of small wires and ribbons can be produced.

Referring now to FIGS. 2 and 3 the present invention utilizes a section or ribbon of thin metallic material having high refractory properties such as tungsten, tantalum or molybdenum as an electrode 20 which is precisely positioned and retained and supported in a holder 22 of a material such as beryllium copper. The holder includes a supporting member 24 and a clamping member 26 adjustably secured to the supporting member by a conventional screw 28.

To position the electrode 20 in the holder 22 the supporting member 24 includes a clamping face or surface 30 which extends from slightly inward of a tapered tip 32 of the holder to a slot 34 that extends from the edge of the surface to a longitudinal surface 33 of the supporting member and includes a retaining shoulder 36 or projection which extends at least along a portion of the surface. It is the function of this shoulder 36 to retain the ribbon electrode from undesirable forward movement once it is clamped in place. Once the electrode 20 is positioned in the slot 34 and in engagement with the clamping surface 30 a holding wedge 40 or clamp is brought into engagement therewith and secured to the supporting member 24 by the clamping screw 28. As the screw is tightened the force of the wedge bearing against the supporting member causes the tip 32 of the supporting member to deflect slightly to position the ribbon electrode at a precise, predetermined angle with the longitudinal surface of the holder.

In the present embodiment the clamping face 30 and the slot 34 are formed at an angle of 17° of arc from the longitudinal surface 33 and the tip 32 is tapered so that when the wedge is secured to the supporting member the tip 32 will deflect 5° of arc; thus positioning the ribbon electrode at an angle of 12° of arc from the longitudinal surface 33. Now, by securing in the movable arms of the weld head two electrode assemblies with the ribbon electrodes in juxtaposition and by providing a means in the movable arms to separate the insulated portions such as a screw extending through one arm into engagement with an insulated pad in the other the gap between the electrodes can be precisely varied through a controllable range of distances.

While one embodiment of this invention has been herein illustrated it should be appreciated by those skilled in the art that variations of the disclosed arrangement both as to its details and to the organization of such details may be made without departing from the spirit and scope thereof. Accordingly, it is intended that the foregoing disclosure and showings made in the drawings may be considered as illustrative of the principles of this invention and not construed in a limiting sense.

What is claimed is:
1. An electrode assembly comprising:
   a rectangular holder member having a tapered tip of lesser cross section than the remainder of said holder, a slot in one surface extending between opposite sides of said member and at an angle of substantially 17° of arc therewith, a clamping surface adjacent to the surface containing said slot bounded by said tip and slot and of the same slope as said slot, said clamping surface having a retaining shoulder along one edge and a transverse bore having a bolt threaded therein and extending outward therefrom,
   an electrode of thin ribbon material in said slot engaging said clamping surface and retaining shoulder and projecting beyond said tip, and
   a clamping wedge having a threaded bore adapted to have said bolt secured therein to clamp said electrode to said clamping surface and to apply a predetermined force to said holder member,
   whereby said force deflecting said tip to precisely position said electrode.
2. An electrode assembly comprising:
   a rectangular holder member having a tapered tip of lesser cross section than the remainder of said holder, a slot in one surface extending between opposite sides of said member and at an angle of substantially 17° of arc therewith, a clamping surface adjacent to the surface containing said slot bounded by said tip and slot and of the same slope as said slot, said clamping surface having a retaining shoulder along one edge of greatest dimension nearest said tip and a transverse bore having a bolt threaded therein and extending outward therefrom,
   an electrode of thin ribbon material in said slot engaging said clamping surface and retaining shoulder and projecting beyond said tip, and
   a clamping wedge having a threaded bore adapted to have said bolt secured therein to clamp said electrode to said clamping surface and to apply a predetermined force to said holder member,
   whereby said force deflecting said tip to precisely position said electrode.

References Cited
UNITED STATES PATENTS

| | | | |
|---|---|---|---|
| 1,839,500 | 1/1932 | Rich | 219—144 |
| 2,448,994 | 9/1948 | McClary | 219—144 |
| 2,688,065 | 8/1954 | Clark | 219—86 |
| 3,100,832 | 8/1963 | Sosoka et al. | 219—119 |
| 3,101,635 | 8/1963 | Kulicke | 219—86 |

RICHARD M. WOOD, *Primary Examiner.*
W. BROOKS, *Assistant Examiner.*